United States Patent [19]

DeYoung et al.

[11] Patent Number: 4,561,641
[45] Date of Patent: Dec. 31, 1985

[54] OFF-HIGHWAY VEHICLE RIDE STRUT AND METHOD

[75] Inventors: Simon A. DeYoung, Lyndhurst; Manny H. Naft, South Euclid, both of Ohio

[73] Assignee: Clark Equipment Company, Buchanan, Mich.

[21] Appl. No.: 212,862

[22] Filed: Dec. 4, 1980

Related U.S. Application Data

[63] Continuation of Ser. No. 943,449, Sep. 18, 1978, abandoned.

[51] Int. Cl.$^4$ .............................................. F16F 9/10
[52] U.S. Cl. .............................. 267/64.13; 188/268; 188/284; 188/322.22; 267/127
[58] Field of Search ............... 188/268, 275, 279, 280, 188/281, 282, 283, 284, 285, 317, 322.22, 316; 267/64.13, 35, 127

[56] References Cited

U.S. PATENT DOCUMENTS

| | | | |
|---|---|---|---|
| 1,563,169 | 11/1925 | Daniel et al. | 188/282 |
| 1,835,110 | 12/1931 | Bates | 188/282 |
| 2,244,501 | 6/1941 | Pierce | 188/284 |
| 2,333,095 | 11/1943 | Dowty | 267/64 A |
| 2,346,667 | 4/1944 | Dowty | 267/64 A |
| 2,360,993 | 10/1944 | Whisler | 188/317 |
| 2,379,750 | 7/1945 | Rossman | 188/284 |
| 2,560,005 | 7/1957 | Shawbrook et al. | 267/64 R |
| 2,606,630 | 8/1952 | Rossman | 188/284 |
| 2,729,308 | 1/1956 | Koski et al. | 188/284 |
| 2,873,964 | 2/1959 | Hamilton | 267/64 R |
| 2,982,537 | 5/1961 | Rumsey | 267/64 A |
| 2,992,816 | 7/1961 | Gail | 267/64 A |
| 3,256,005 | 6/1966 | Taylor | 267/64 A |
| 3,428,303 | 2/1969 | Lynch | 267/65 R |
| 3,503,472 | 3/1970 | Axthammer | 188/282 |
| 3,549,168 | 12/1970 | Swanson | 267/64 R |
| 3,682,461 | 8/1972 | Wachenheim | 188/317 |
| 3,726,368 | 4/1973 | Taylor | 188/316 |
| 3,868,097 | 2/1975 | Taylor | 267/64 R |
| 3,933,344 | 1/1976 | Taylor | 267/64 A |
| 4,139,182 | 2/1979 | Nagara et al. | 188/285 |

FOREIGN PATENT DOCUMENTS

| | | |
|---|---|---|
| 298064 | 11/1965 | Netherlands . |
| 132075 | 6/1951 | Sweden . |
| 1267508 | 3/1922 | United Kingdom . |
| 486205 | 6/1938 | United Kingdom . |
| 570813 | 7/1945 | United Kingdom . |
| 631376 | 11/1949 | United Kingdom . |
| 683198 | 11/1952 | United Kingdom . |
| 763557 | 12/1956 | United Kingdom . |
| 887191 | 1/1962 | United Kingdom . |
| 998742 | 7/1965 | United Kingdom . |
| 1226534 | 3/1971 | United Kingdom . |
| 1411218 | 10/1975 | United Kingdom . |

*Primary Examiner*—George E. A. Halvosa
*Attorney, Agent, or Firm*—Watts, Hoffmann, Fisher & Heinke Co.

[57] ABSTRACT

A compressible liquid ride strut includes a ported piston which reciprocates in a cylinder chamber to divide the chamber into two sections. The piston ports provide controlled flow of liquid from one section to the other. A valve member engages the piston upon extreme rebound strut extension to greatly diminish flow of liquid through the piston and increase the rebound dampening rate of the strut. The valve member is acted on by a pair of springs which hold the valve member away from the piston during normal operation and permit it to move against the piston during rebound.

18 Claims, 11 Drawing Figures

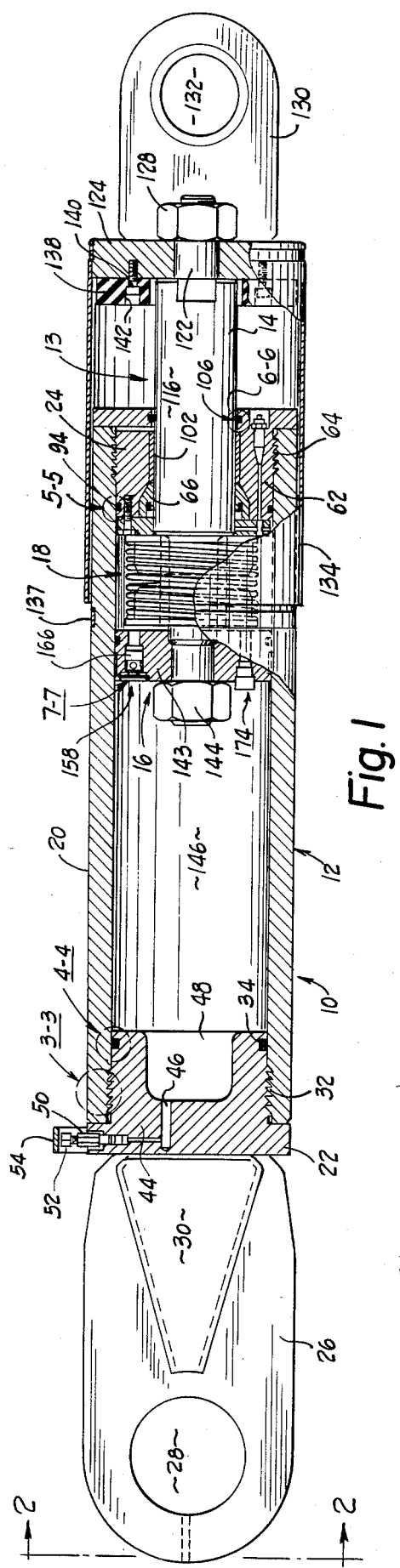
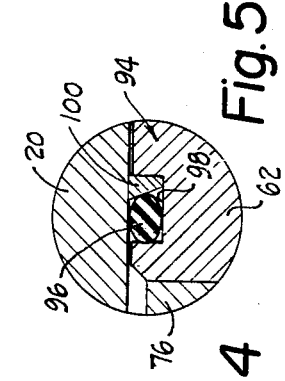
Fig.5
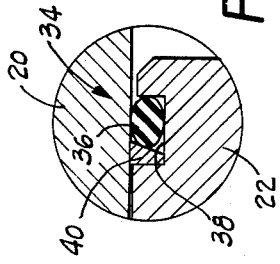
Fig.4
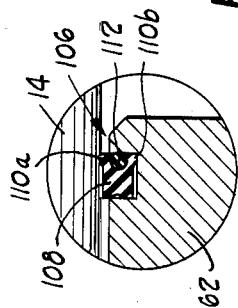
Fig.6
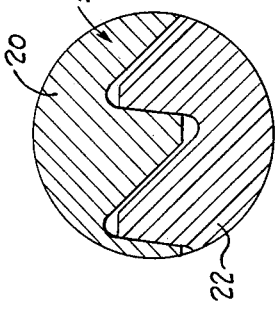
Fig.3
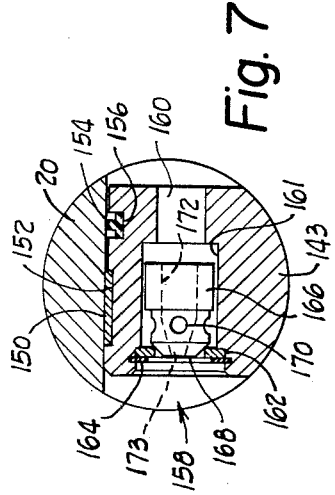
Fig.7
Fig.1
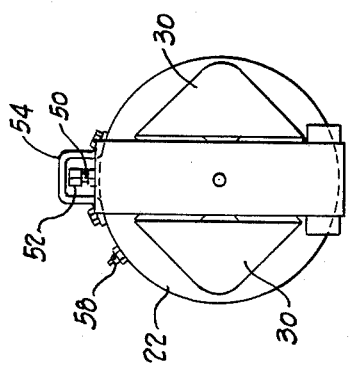
Fig.2

OFF-HIGHWAY VEHICLE RIDE STRUT AND METHOD

This is a continuation of application Ser. No. 943,449 filed 9/18/78 now abandoned.

BACKGROUND OF THE INVENTION

1. Field of the Invention

This invention relates to off-highway load haul vehicle ride struts and more particularly to a ride strut that uses a compressible liquid and method of maintaining such struts.

Load hauling off-highway vehicles are used in such applications as highway construction and mining. For many years these vehicles were constructed without any spring suspension of any kind except that limited amount of springing provided by the vehicle tires. These unsprung vehicles were operated at relatively slow speeds of the order of 10 miles per hour and at those speeds both the operators and the vehicles were able to tolerate the punishment inflicted by the rigid suspensions.

Modern off-highway haulers no longer are operated at such low speeds. In mining operations, for example, these off-highway vehicles are operated along haul roads at speeds of the order of 40 miles per hour. Carrying capacities, like speeds of operation, have also greatly increased such that payloads may be of the order of 200 tons or more. With such speeds and payloads, sprung suspensions have become a necessity because fatigue of both operator and vehicle would be prohibitive without them.

The first sprung suspensions were rather similar in principle to those used in over-the-highway vehicles. For example, vehicles were constructed with coil spring suspensions and shock absorbers to dampen the spring action.

In recent times, ride struts have been developed which are intended to perform both suspension and shock absorbing functions. These struts have used various types of internally contained springs including rubber, metal and liquids.

While many different ride struts have both been proposed and developed, none has been fully satisfactory because the punishment inflicted in off-highway load hauling causes excessive failures. Failures are inordinantly expensive because (a) struts are expensive, (b) the lost vehicle's production is extremely expensive, and (c) repairs on load haul vehicles are often difficult especially when the breakdowns occur at remote locations where weather conditions may be severe.

So-called liquid spring ride struts have been known for some applications for many years but they have exhibited shortcomings in off highway load haul applications. With these struts, a compressible liquid such as a liquid silicone provides spring suspension. A typical strut has a cylinder that defines a liquid containing chamber. A ported piston is in the chamber and connected to a piston rod. The rod extends from one end of the cylinder. The weight of the vehicle pushes the piston rod into the cylinder to compress the liquid and effect a springing action. The ported piston functions to dampen that action and thus functions as a shock absorber.

One major advantage of a liquid strut is the liquid spring has effectively an endless life so long as the strut itself does not fail. The reason the spring has an effectively endless life is that a liquid strut can be charged with additional liquid to replenish lost liquid. So long as there is a proper quantity of the correct liquid the appropriate spring capacity is maintained, as contrased with metal and rubber springs, spring fatique is eliminated as a factor in suspension life.

Another advantage of liquid struts is that with an appropriately ported piston to permit controlled fluid flow from one side of the piston to the other, the liquid ride strut functions both as a spring suspension and a shock absorber to dampen spring action.

While liquid struts have these and other advantages, the prior struts have also had shortcomings. One shortcoming has been their inability to properly withstand the forces imposed under so-called "rebound" conditions. A rebound condition occurs when a vehicle bounces and leaves the ground or when a wheel drops into a hole or the like such that the strut becomes extended and is in tension supporting the weight of a wheel and axle assembly rather than being compressed to support the vehicle above its wheel and axle.

Attempts have been made to solve the rebound problem in ride struts, but none has been fully satisfactory. For example, attempts have been made to use rubber discs as a rebound cushion but they tend to degrade at an excessive rate when exposed to liquid spring materials such as liquid silicones.

Other attempts at rebound control have not provided both (a) a high dampening rate desired for rebound conditions which will function to inhibit and substantially to prevent damage to the strut or other vehicle components; and (b) ample flow rates through a ported piston to permit the desired rate of piston movement when the strut is operating to function as a vehicle support.

SUMMARY OF THE INVENTION

The present invention provides a vehicle in which a liquid ride strut is provided that overcomes the described and other problems. Superior rebound characteristics are obtained by providing a high rebound dampening rate.

A strut made in accordance with the invention has a piston disposed for reciprocation within a cylinder which is closed at one end. The other end of the cylinder carries a gland element which establishes a sliding, sealing relationship with a piston rod that is connected to the piston. The piston includes passages for providing controlled liquid flow through it and sealing members to engage the inner surface of the cylinder in a sliding, sealing relationship.

The piston accordingly divides a cylinder into two sections, one between the piston and the closed end of the cylinder, and the other between the piston and the gland element. Both sections are filled with liquid and, due to fluid flow through the piston passages, internal strut pressure is equalized except for short periods of time after sudden substantial changes in loading.

The ride strut has a high liquid flow rate through the piston upon compression, an intermediate liquid flow rate through the piston upon extension through a normal operating range and a very low flow rate during rebound extension. To accomplish normal range operation a plurality of unobstructed passages are provided in the piston while other piston passages include check valves. The valved passages permit largely unobstructed flow of liquid upon compression, but decrease the flow upon normal range extension.

The very high rebound dampening rates are achieved by further restrictions of flow through the piston passages through additional valving. This valving is provided by a pair of flanged collars carried by the piston rod one of which, under rebound extension, is forced into engagement with the piston.

The collars are biased apart by a first spring and the collar closest to the piston (valve member) is biased away from the piston by a second and weaker spring. As maximum strut extension is approached, an obstruction is encountered by the collar spaced furthest from the piston (coacting member) so that the coacting member is displaced toward the piston. In turn, since the second spring is weaker the valve member is displaced into engagement with the piston so that the orifices are covered.

A plurality of small openings are provided in the valve member so that liquid may flow through the valve member. An annulus connects the openings and overlies the orifices so that a very small amount of liquid can pass through the valve member and the piston, no matter how extreme the strut extension may be. By appropriate control of the dimensions of the orifices, the annulus, and the openings through the valve member, the liquid flow characteristics under any strut displacement can be controlled quite accurately.

A portion of the piston rod also carries a resilient pad which, when extreme strut compression is reached, engages a portion of the cylinder to prevent overstressing the ride strut components. Although such extreme strut compression will be achieved rarely, if ever, the resilient pad serves as a safety measure to protect the strut in that event.

The foregoing features provide a liquid ride strut of extreme strength and simplicity and one which can be tailored quite accurately to diverse, demanding conditions. Additional advantageous features of the invention will become apparent from the following detailed description of the preferred embodiment of the invention made with reference to the accompanying drawings which form a part of the specification.

DESCRIPTION OF THE DRAWINGS

FIG. 1 is a side view, partly in section, of an hydraulic ride strut according to the invention.

FIG. 2 is an end view of the strut as seen from the plane indicated by the line 2—2 of FIG. 1.

FIG. 3 is an enlarged sectional view of area 3—3 of FIG. 1, showing in more detail a thread construction.

FIGS. 4, 5, and 6 are enlarged views of areas 4—4, 5—5 and 6—6, respectively, of FIG. 1, showing seal and wiper constructions in more detail.

FIG. 7 is an enlarged view of area 7—7 of FIG. 1, showing a piston check valve and passage.

DESCRIPTION OF THE PREFERRED EMBODIMENT

Figure 8:
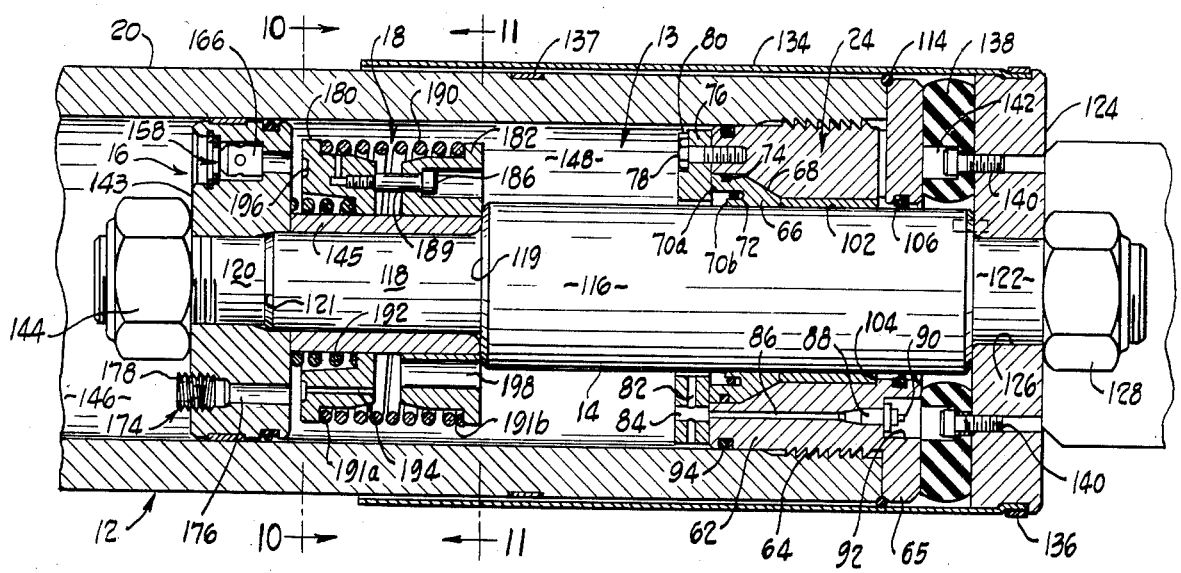
FIG. 8 is an enlarged view, partly in section, showing the relationship of ride strut components showing the ride strut components under full compression.

A ride strut assembly 10 is shown in FIG. 1. The ride strut 10 is comprised of several subassemblies, including a body 12, a rod assembly 13 including a piston rod 14, a piston 16, and a valve section 18. The ride strut is for use in large off-highway haul vehicles in which loads of up to 200 tons or more are carried.

An example, a ride strut for use on a 170 ton capacity vehicle will, in the extended position, have an overall length of approximately 82 inches, a piston diameter of about 8 inches, and a piston rod diameter of about 4.25 inches. The ride strut will have a stroke (or compression excursion) from the vehicle rest position on the order of 4.50 inches, and a rebound extension (or expansion excursion) from the vehicle rest position on the order of 1.50 inches.

The body 12 is filled with a compressible silicone liquid which provides the spring action. An acceptable liquid is silicone fluid with compressibility ranging from 0.36 percent at 500 psi to 11.60 percent at 30,000 psi. Approximately 4.4 gallons of liquid are required for a ride strut of the dimensions given.

1. The Body Subassembly 12

The body is a tubular housing including an elongate cylinder 20 which is closed at its lower end by an end cap 22, FIG. 1. An annular gland element 24 is threaded into the upper end of the cylinder 20 in a sliding, sealing relationship with the piston rod 14 to close the upper end of the cylinder. A rod eye 26 extends outwardly of the end cap and has an opening 28 for attachment to a vehicle axle. Reinforcing members 30 are on either side of the rod eye 26. The end cap, rod eye, and reinforcing members are secured permanently to each other by welds.

The end cap is secured within the cylinder 20 by buttress threads 32, illustrated in detail in FIG. 3. Buttress threads have been chosen because they are adapted well for taking heavy loads in one direction, as will occur in the present case due to the internal body pressure tending to force the end cap from the end of the cylinder.

A seal 34 is interposed between the end cap and the cylinder to prevent liquid from leaking from the housing. Referring to FIG. 4, the seal 34 comprises an O-ring 36 disposed within a circumferential groove 38 formed in the end cap. A chamfered ring 40 also is disposed in the groove 38 to compress the O-ring and to be compressed itself against the inner surface of the cylinder 20.

Shock-absorbing liquid is charged into the ride strut (and bled from the ride strut if need be) through the end cap. A first passage 44, FIG. 1, extends radially inwardly from an exposed portion of the end cap toward the center of the end cap. The passage 44 communicates with a second, longitudinally extending passage 46 which, in turn, communicates with a recessed portion 48 formed in the inner end of the end cap. Referring especially to FIG. 2, a charge valve 50 having a closure cap 52 is fitted into the exposed end of the first passage 44. The charge valve and closure cap are protected by a U-shaped bracket 54 which is secured to the end cap by a bolt 56. When the bolt and U-shaped bracket have been removed, access may be had to the closure cap 52 and thence to the charge valve 50.

A separate air bleed valve 58 is provided for the end cap, FIG. 2. The bleed valve is displaced angularly from the charge valve 50 and communicates with the interior of the body via passages (not shown) similar to the first and second passages 44, 46. When liquid is charged into the body, internal pressure eventually increases to the point where the ride strut becomes extended. This is the way vehicle ride height and internal ride strut preload are controlled. Similarly, if ride height and preload are too great, liquid can be bled from the body through the charge valve.

Figure 9:
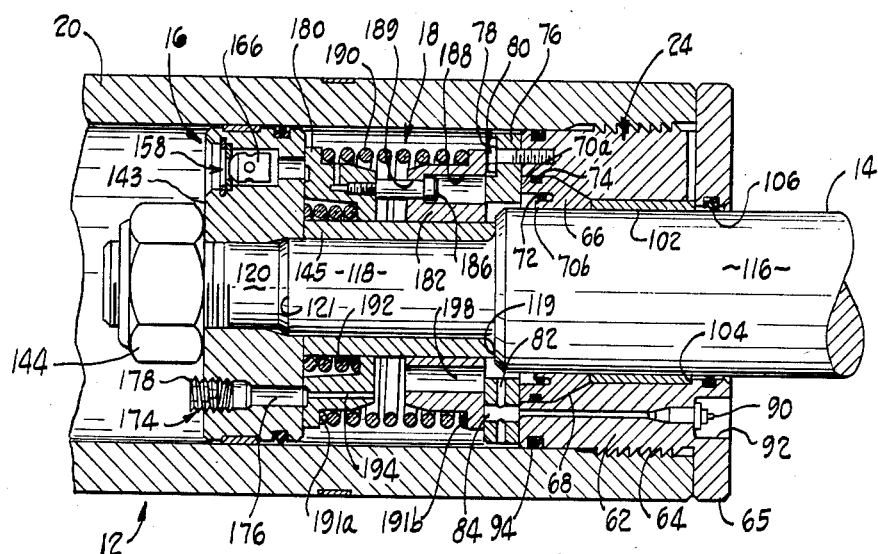
FIG. 9 is a view similar to FIG. 8, showing the ride strut components in the rebound range of strut extension.

Referring to FIGS. 1, 8 and 9 the gland element 24 includes an inwardly extending collar 62 secured within the cylinder by buttress threads 64. The buttress threads 64 are identical to the buttress threads 32 illustrated in FIG. 3. The gland element also has an end flange portion 65 which overlies and engages the end of the cylinder 20. The gland element functions to provide a leak-free closure with, and alignment of, the piston rod 14. A rod seal 66 having a bore of approximately the same diameter as the piston rod is carried by the collar 62. Referring to FIGS. 8 and 9 the rod seal 66 has (a) a frustoconical portion 68 which mates with a complementary portion of the collar 62 and (b) a pair of spaced lips 70a, 70b which face axially toward the lower end of the ride strut. The rod seal 66 is formed of polytetrafluoroethylene (TEFLON) because of the anti-friction and sealing characteristics of this material.

An O-ring 72 is positioned between lips 70a, 70b to maintain appropriate radial spacing between them. Another O-ring 74 surrounds the outer lip 70a and engages the inner surface of the collar 62.

An annular retainer and rebound stop 76 is secured to the inner end of the collar 62 by bolts 78 (only one of which is shown). The retainer 76 engages the outer lip 70a of the seal 66 to retain the seal in place. The bolts 78 are fitted into countersunk portions 80 of the retainer. The inner diameter of the retainer is larger than the outer diameter of the piston rod so that liquid may flow between them.

The retainer includes a radially extending passageway 82 which intersects an axially extending passageway 84. An axial passageway 86 extends through the collar 62 and is aligned with the axially extending passageway 84. A bleed valve 88 having a plug 90 is fitted into the passageway 86. By this construction, air may be bled from the strut when liquid is charged into it during assembly. The bleed valve and plug are fitted within a countersink 92 formed in the collar 62 so that the bleed valve and plug will not be damaged upon full strut compression.

An outer seal 94 is provided for the collar 62 to minimize or prevent liquid from leaking to the buttress threads 64. Referring to FIG. 5, the seal 94 comprises an O-ring 96 disposed within a circumferential groove 98 formed in the collar. A chamfered ring 100 also is disposed in the groove 98 to compress the O-ring outwardly and to be compressed itself against the inner surface of the cylinder 20.

A split ring guide 102 is disposed intermediate the collar 62 and the piston rod 14, (FIGS. 1, 8 and 9). The guide 102 engages the upper end of the rod seal 66. The guide 102 is held stationary by engagement with a shoulder 104 of the gland 24 best seen in FIG. 9.

In order to exclude dirt or other contaminants from the guide 102 and the rod seal 66, a dirt wiper 106 is provided for the interface between the flange 104 and the piston rod 14. Referring to FIG. 6, the wiper 106 comprises an annular ring 108 having axially facing lips 110a, 110b. An O-ring 112 is fitted between the lips 110a, 110b to expand the lips and thus effect a sealing function.

2. The Piston Rod Assembly 13

The piston rod 14 is comprised of an elongate, cylindrical section 116 from which cylindrical sections 118, 120 of progressively decreasing diameter project. The sections 118, 120 are connected by a beveled surface 121 while the sections 116, 118 are connected by a radially disposed shoulder and bevel 119. The valve section is carried by the intermediate-sized cylindrical section 118 and the piston is carried jointly by the section 118 and the smallest section 120.

As is best seen in FIG. 8, threaded cylindrical section 22 projects from the other end of the rod. A disk 124 having an opening 126 is secured to the piston rod by a nut 128 threaded to the end of the section 122. A two part rod eye 130 (only one leg of which is shown in FIG. 1) extends outwardly of the disk and includes an opening 132 for attachment to the vehicle frame. The disk and rod eye are secured permanently to each other by welds.

In order to shield the piston rod from dirt or other contaminants, a cylindrical rubber shroud or boot 134 is secured to the perimeter of the disk. The boot is concentric with the outer surface of the cylinder 20 and surrounds a dust seal O-ring 114. The shroud overlaps the body 20 a convenient distance to make the entrance of dirt difficult. The boot is deformed into a perimetral groove in the disk 124 and secured there by a circumferential clamp 136.

In order to determine whether the amount of liquid in the ride strut is correct, a band 137 is secured about the circumference of the cylinder 20. The axial location of the band 137 is chosen so that when the proper amount of the liquid is in the strut when the vehicle is empty, the bottom edge of the boot will overlap the band. The band preferably is comprised of tape of a color contrasting with that of the cylinder and the boot, so that the position of the boot with respect to the band may be determined readily.

A resilient pad 138 is secured to the inner face of the disk 124 to cushion any impact with the end of the collar 62 upon maximum strut compression. The pad is secured to the disk by bolts 140 which are fitted into countersunk portions 142 of the pad. Clearance is provided between the inner diameter of the pad and the cylindrical section 116; clearance also is provided between the outer diameter of the pad and the boot 134. These clearances, along with the countersunk portions 142, permit the pad to flex upon compression to minimize the chance of damage to any of the components.

3. The Piston Subassembly 16

The piston subassembly is an annular subassembly carried by the piston rod near the inner end of the piston rod. The subassembly includes a piston 143 having a through bore contoured to coact with the surfaces of the projecting cylindrical sections 118, 120 and to be spaced from the beveled connection 121 between them. A nut 144 is threaded to the end of the protecting portion 120. The piston is torqued securely onto the end of the piston rod and against a spacing sleeve 145 around the section 118 and abutting the shoulder 119 so that relative motion between the piston and rod is prevented, (FIGS. 8 and 9).

The piston subassembly performs two main functions: (a) it maintains the concentric relationship of the cylinder and piston rod; and (b) durng rapid piston excursions, the piston acts as a dashpot. To achieve these goals, the piston subassembly engages the inner surface of the cylinder 20 in a sliding, sealing relationship so that the body chamber is divided into first and second sections 146, 148, (FIG. 8). It is apparent that their volumes will change relatively as the piston subassembly is moved up and down within the cylinder, although the first section 146 always is larger than the second section 148. The relationship between volumes does not vary linearly because the piston rod occupies an increasingly greater portion of the second section upon piston rod compression. Thus, the total volume of the chamber decreases as the piston rod enters the body and the liquid is compressed.

The piston 143 includes openings so that liquid can be passed from one section to another upon displacement of the piston. In order to achieve the desired flow rate upon compression and expansion in the normal operating range of the piston, it has been found that a combination of orifices and check valves is effective.

The seal and check valve construction is shown in detail in FIG. 7. A split bearing ring 150 is disposed within a circumferential groove 152 in the outer periphery of the piston. Sealing action also is obtained by a piston seal ring 154 disposed within a circumferential groove 156 formed in the periphery of the piston. Taken together, the bearing ring and the seal ring act to establish an effective sliding, sealing relationship with the inner surface of the cylinder 20.

Two check valves spaced diametrically from each other are provided. Only one of these valves is shown at 158 in each of FIGS. 1, 8, and 9 because the cross-section of the piston is taken in two planes to show both a valved passage and a constricted passage 174. Referring to FIG. 7 the check valve 158 controls fluid flow through a passage 160 extending completely through the piston. The passage 160 includes a counterbore 161. An annular valve seat 162 is held in place at the lower end of the counterbore by a snap ring 164. A valve body 166 is disposed in the counterbore 161 for limited axial movement. The valve body 166 includes a tapered end 168 which selectively engages the seat to provide a substantially liquid-tight seal. The valve body also includes a plurality of radially extending passages 170 in communication with a longitudinally extending valve body bore 172. The bore 172 communicates a reduced diameter, axially disposed, constricting bore 173.

Upon compression of the ride strut, the piston will be advanced to the left in FIG. 1, and the valve body 166 will be forced to the right by the action of impinging liquid to the position shown in FIG. 8. The tapered end of the valve body thus will be unseated and liquid will flow both through the passages 170 and through the constricting bore 173 into the valve body bore 172. Upon extension of the ride strut, the piston will be advanced to the right in FIG. 1, and impinging liquid will drive the tapered end of the valve body against its seat so that liquid can flow through the check valve only through the constructing bore 173 and not through the passages 170.

Two-way flow of liquid through the piston is also provided by the two constricted passages spaced diametrically from each other, only one of which is shown at 174 because they are identical. In the Figures, the illustrated constricted passage 174 is shown as if it were 180° out of position relative to the valved passage 160 for purposes of illustration rather than its actual 90° relationship. The constricted passage is formed by an opening 176 extending completely through the piston into which a constricting orifice body 178 is threaded (FIGS. 8 and 9). By selection of orifice bodies and check valve bodies having openings of appropriate sizes, the damping characteristics of the ride strut can be established quite accurately. The orifice bodies and check valve bodies are relatively inexpensive but provide precise flow control so that once the desired sizes have been empirically selected ride struts having consistant damping characteristics can be manufactured rapidly and with favorable tooling expense.

4. The Valve Section 18

The valve section has spaced, annular valve and coacting spools or members 180, 182 adapted for limited axial movement under the influence of a spring bias. They are slidably carried on the spacer sleeve 145. The valve and coacting members are held together by a plurality of shoulder bolts 186. The heads of the bolts are normally positioned in counterbores 188 formed in the coacting member 182 while the shanks of the bolts are slidable in connecting bores 189. An helical spring 190 is disposed intermediate flanged portions 191a, 191b of the valve and coacting members to bias them apart to the extent permitted by the bolts 186.

A smaller diameter helical spring 192 is disposed intermediate the piston 16 and the valve member 180. The smaller spring 192 acts on the valve member 182 to bias the valve section to the right as shown in FIG. 8. This spring action maintains the coacting member in engagement with the shoulder 119 and the valve section spaced from the piston passages except during rebound conditions.

Figure 10:
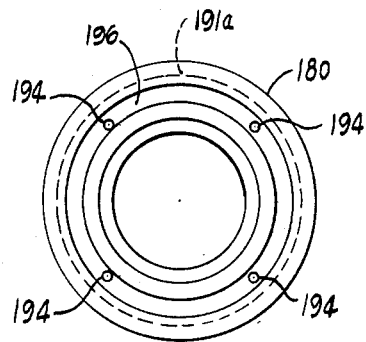
FIGS. 10 and 11 are views as seen from the planes indicated by the lines 10—10 and 11—11, respectively, of FIG. 8, each showing an end view of valve components.
Figure 11:
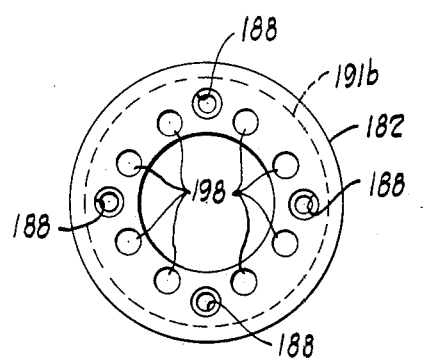

Referring to FIGS. 10 and 11, the valve and coacting members 180, 182 include various openings for permitting the passage of liquid. The valve member 180 includes four openings 194 extending completely through it. An annulus 196 is formed in that face of the valve member 180 facing the piston 143 and connecting the openings 194 so that when the valve member is pressed against the piston, liquid still can flow through the valve and the piston, but at a greatly reduced rate due to the constricting effect of the openings 194. The rebound flow path is through the openings 194, the annulus 196, and the valve member and constriction passages 172, 174 in the piston assembly 16.

The coacting member 182 includes a plurality of openings 198 extending completely through the valve spool. The openings 198 permit the effective and complete air bleeding when strut is initially charged with liquid.

OPERATION

The relationship of the ride strut components under an unloaded vehicle condition is not shown in the drawings. FIG. 1 shows the relationship of the parts off the vehicle when sufficient liquid has been charged into the body 12. In an empty vehicle the piston rod and piston subassemblies 13, 16 will shift to the left, as viewed in FIG. 1, relative to the cylinder subassembly 12, until the bottom of the boot 134 overlaps the band 137. Under these conditions the valve section 18 is spaced from both the piston and the retainer and rebound stop 76 as it is and as shown in FIG. 8 which is the full compression position of the strut. Thus in the normal operating range of movement the valve section has no influence on liquid flow.

When the ride strut is under load the strut components will be moved toward that position shown in FIG. 8. Because of the impinging liquid encountered during the compression excursion, the valve body 166 has been driven away from its seat so that liquid has flowed through the piston at its maximum rate flowing from the lower chamber section to the upper. In the FIG. 8 condition the collar 62 including its flange 65 has impacted the resilient pad 138 so that energy from the force applied to the ride strut is being absorbed by the pad.

When the piston and rod subassemblies rise from the position of FIG. 8, the valve body 166 seats against the valve seat 162 to restrict flow. This flow restriction provides a shock absorbing effect dampening the spring action of the compressible liquid. This condition continues during strut extension until the strut vehicle empty position is obtained.

As the strut is unloaded in an extreme rebound condition the coacting member 182 engages the annular retainer and rebound stop 76 FIG. 9. As slight further extension continues, the relatively light smaller spring 192 is compressed until the valve member 180 contacts the piston as shown in FIG. 9. Positioning the valve member against the piston greatly increases the damping characteristics of the ride strut. Liquid flow through the piston is reduced drastically because all of the openings in the piston are covered by the valve member. Except for the small valve spool openings 194 communicating with the valve member passages 172 and the constricted orifices 174 via the annulus 196, liquid flow from the upper chamber section to the lower no longer is possible.

Under normal circumstances, the ride strut will be operated between the position shown in FIGS. 8 and 9. Because the springs 190, 192 and the pad 138 are not compressed under these circumstances, the compressibility characteristics of the liquid and the dashpot characteristics of the piston will define the damping capabilities of the strut.

Although the invention has been described with a certain degree of particularity, it will be appreciated that the present disclosure of the preferred embodiment has been made only by way of example. Various changes in the details of construction may be resorted to without departing from the true spirit and scope of the invention and it is intended to cover all such changes in the appended claims.

What is claimed is:

1. A vehicle ride strut comprising:
   (a) an elongated tubular housing that is closed at one end and has an opening at its other end;
   (b) a ported piston slidably disposed in the housing and separating the housing into two chambers;
   (c) a shouldered piston rod projecting through the housing in slidably sealed relationship and connected to the piston;
   (d) a compressible liquid substantially filling the chambers for compression as the piston rod moves into the housing and reduces the total volume of the chambers and expansion as the rod moves in an opposite direction in strut extension;
   (e) a valve element positioned in one of the piston ports for permitting a flow rate from one chamber to the other during liquid compression that is higher than the flow rate as the liquid expands;
   (f) an annular ported, spool member around the piston rod and interposed between the piston and the rod shoulder;
   (g) a pair of springs of differing strengths disposed around the piston rod, the weaker of the springs being interposed between the piston and the spool member and the stronger being between the spool member and the rod shoulder;
   (h) actuation means within the housing and coactable with the spool member to move it from a normal position spaced from the piston to a rebound position adjacent the piston;
   (i) other structure within the housing acting against the spool member to maintain it in a normal position other than when the actuation means acts on the spool member to move it to its rebound position; and,
   (j) at least one spool member port being in fluid communication with a piston port when the spool member is in its rebound position.

2. The strut of claim 1 wherein there is an annular coacting member around the rod and between the stronger spring and the shoulder and wherein the other structure is a stop element coacting with the members to limit the relative movement due to action of the stronger spring.

3. The strut of claim 2 wherein the stop element is a shouldered bolt.

4. The strut of claim 1 wherein the piston port which is communicatable with a spool member port is a port other than said one piston port.

5. A ride strut of the type employing a compressible liquid, comprising:
   (A) a piston rod;
   (B) a cylinder closed at one end and disposed about the piston rod;
   (C) the cylinder having an inwardly extending portion near its open end, the inwardly extending portion establishing a sliding, sealing relationship with the piston rod;
   (D) a piston structure secured to the piston rod, the piston structure being disposed within the cylinder between the closed end and the inwardly extending portion, the piston structure having first and second orifices for providing controlled liquid flow through the piston structure, the piston structure engaging the inner surface of the cylinder in a sliding, sealing relationship;
   (E) a first chamber defined by the piston structure and the closed end of the cylinder;
   (F) a second chamber defined by the inwardly extending portion of the cylinder and the piston structure, the chambers being in communication via the orifices so that, upon displacement of the ride strut components, liquid disposed within one chamber can be transferred to the other chamber through the piston in a controlled fashion to effect a damping function;
   (G) the first orifice permitting a two-way flow of liquid through the piston;
   (H) the second orifice including a check valve to largely unobstructed liquid flow from the first chamber to the second chamber but restricted flow from the second chamber to the first chamber; and
   (I) a valve assembly for reducing a major portion of the liquid flow from the second chamber to the first chamber through the orifices as the piston is displaced to a predetermined position relatively near the inwardly extending portion of the cylinder, the valve assembly comprising:
  (i) a valve spool carried by the piston rod and disposed within the second chamber, the valve spool being displaceable along the longitudinal axis of the piston rod;
  (ii) a first biasing means acting on the valve spool to urge the valve spool away from the piston; and
  (iii) actuating means for acting on the valve spool to displace the valve spool into engagement with the piston structure as the piston structure reaches the predetermined position, whereby the valve spool is urged against the first biasing means to cover the orifices in the piston structure thereby to inhibit the flow of liquid through the piston, the actuating means including a second biasing means interposed between the spool and the piston rod.

6. The strut of claim 5 wherein:
(a) the actuating means further comprises:
  (i) a second valve spool carried by the piston rod and disposed intermediate the first valve spool and the inwardly extending portion of the cylinder; and,
  (ii) an obstruction which engages the second valve spool and causes relative movement between the second valve spool and the piston as the piston reaches the predetermined position; and
(b) the second biasing means is a spring disposed intermediate the valve spools to bias the valve spools apart.

7. A piston rod assembly comprising:
(a) a ported piston carried by the piston rod;
(b) a valve spool carried by the rod and movable from a position spaced from the piston to a position at least partially overlying the piston ports;
(c) a first spring disposed intermediate the valve spool and the piston to bias the valve spool away from the piston to its spaced position;
(d) a coacting spool, the valve spool being disposed between the piston and the coacting spool;
(e) a second spring disposed between the spools to bias the spools apart;
(f) the second spring being stronger than the first spring so that, upon displacement of the coacting spool toward the piston, the first spring will be compressed until the valve spool reaches its overlying position; and
(g) stop means coactable with the spools to limit movement of the spools away from one another under the action of the second spring.

8. The assembly of claim 7 wherein the first valve spool completely overlies the piston ports when the valve spool is in its overlying position and wherein the spool has at least one port aligned with a piston port when in such overlying position.

9. The assembly of claim 7, wherein the valve spool includes orifices to permit fluid flow through both the valve spool and the piston when the first valve spool is in its overlying position.

10. A liquid ride strut, comprising:
(a) a tubular housing defining a chamber;
(b) a piston slidably disposed in the chamber to divide the chamber into two sections;
(c) a piston rod connected to the piston and projecting from the housing;
(d) a seal structure interposed between the rod and the housing to effect a fluid seal therebetween;
(e) the piston including at least one through fluid passage extending from one section to the other;
(f) a valve assembly member around the rod and including a valve member movable from a normal position in spaced relationship with the piston passage to a rebound position adjacent the passage;
(g) a coacting member around the rod, the rod and the coacting member having coacting surfaces preventing movement away from the piston beyond a predetermined position;
(h) a first spring around the rod and biasing the valve toward its normal position and yieldably permitting movement of the valve member to its rebound position whenever the rod and housing approach a position of maximum extension;
(i) said valve member when in the rebound position limiting fluid flow through the piston passage whereby to provide a high damping rate under rebound conditions; and
(j) a second and stronger spring between the members for maintaining the valve member in its rebound position through a range of rebound movement.

11. The strut of claim 10 wherein a stop limits relative movement of the members away from one another under the action of the second spring.

12. For use in a liquid ride strut, a piston, piston rod assembly comprising:
(a) a piston for slidable disposition in a housing chamber divide the chamber into two sections;
(b) a piston rod connected to the piston;
(c) the piston including at least one through fluid passage;
(d) a valve member around the rod and movable from a normal position in spaced relationship with the piston passage to a rebound position adjacent the passage;
(e) a coacting member around the rod and positioned with the valve member between the piston and it, the coacting member and the rod having cooperating structure limiting movement of the coacting member in a direction away from the piston;
(f) a first spring between the members and biasing the valve member toward the piston;
(g) a second spring between the piston and the valve member and normally biasing the valve member into its normal position and adapted when in use to yieldably permit movement of the valve member to its rebound position whenever the rod and the housing approach a position of maximum extension; and
(h) said valve member when in the rebound position being adapt to limit fluid flow through the piston passage whereby to provide a high damping rate under rebound conditions while normally preventing such high damping rate.

13. The strut of claim 12 wherein a stop limits relative movement of the members away from one another under the action of the first spring.

14. A liquid ride strut comprising:
(a) a housing structure defining a fluid chamber and having a piston rod opening;
(b) a piston structure mounted in the housing structure to separate the chamber into two sections;
(c) at least one of the structures being configured to establish a fluid flow path between the sections;
(d) a piston rod connected to the piston structure and projecting through the opening;

(e) a compressible liquid substantially filling the sections;
(f) a fluid seal interposed between the rod and housing structure to effect a seal in the opening;
(g) the structures being relatively movable throughout an operating range and throughout a rebound range;
(h) the strut including valving means establishing:
  (i) a first flow condition through said flow path when the rod and housing structures move relatively in a compressive direction in the operating range;
  (ii) a second more restrictive flow condition when the rod and housing structures move relatively in an extending direction and the structures are in the operating range; and
  (iii) a third and still more restrictive flow condition whenever the rod and housing structures move relatively in an extending direction through the rebound range; and
(i) the valving means comprising:
  (i) a valve spool;
  (ii) a first spring disposed intermediate the valve spool and the piston structure to bias the valve spool away from the piston structure;
  (iii) a second valve spool, the first valve spool being disposed between the piston structure and the second valve spool; and
  (iv) a second spring disposed between the valve spools to bias the valve spools apart.

15. The ride strut of claim 14 wherein the second spring is stronger than the first spring so that, upon displacement of the second valve spool toward the piston structure, the first spring will be compressed until the first valve spool engages the piston and only then will the second spring be compressed.

16. The strut of claim 14 wherein the one structure is the piston structure.

17. The ride strut of claim 16 wherein the first valve spool completely overlies the piston structure orifices when the valve spool is in its overlying position.

18. The ride strut of claim 17 wherein the valve spool includes orifices to permit fluid flow through both the valve spool and the piston structure when the first valve spool is in its overlying position.

* * * * *